United States Patent
Brandner et al.

(10) Patent No.: US 8,747,504 B2
(45) Date of Patent: Jun. 10, 2014

(54) GAS-SOLIDS SEPARATION UNITS AND METHODS FOR THE MANUFACTURE THEREOF

(75) Inventors: Kevin J. Brandner, Streamwood, IL (US); Brian W. Hedrick, Oregon, IL (US)

(73) Assignee: UOP LLC, Des Plaines, IL (US)

( * ) Notice: Subject to any disclaimer, the term of this patent is extended or adjusted under 35 U.S.C. 154(b) by 264 days.

(21) Appl. No.: 13/328,528

(22) Filed: Dec. 16, 2011

(65) Prior Publication Data

US 2013/0152525 A1    Jun. 20, 2013

(51) Int. Cl.
*A47L 5/36*    (2006.01)

(52) U.S. Cl.
USPC ............... 55/447; 55/410; 55/417; 55/423; 55/424; 55/347; 55/428; 55/348; 55/457

(58) Field of Classification Search
CPC ........ B01D 45/16; B01D 45/08; B01D 45/12; A47L 9/1683; A47L 9/1641
USPC ........... 55/410, 417, 423, 424, 428, 447, 348, 55/396, 457, 347
See application file for complete search history.

(56) References Cited

U.S. PATENT DOCUMENTS

| | | | |
|---|---|---|---|
| 3,415,042 A * | 12/1968 | Wilson | 55/348 |
| 3,478,494 A | 11/1969 | Lusfenader et al. | |
| 3,713,280 A * | 1/1973 | Keller et al. | 55/360 |
| 4,572,780 A | 2/1986 | Owen et al. | |
| 5,690,709 A * | 11/1997 | Barnes | 55/348 |
| 6,673,133 B2 | 1/2004 | Sechrist et al. | |
| 6,797,026 B2 * | 9/2004 | Sechrist et al. | 55/348 |
| 2002/0144931 A1 | 10/2002 | Sechrist et al. | |

FOREIGN PATENT DOCUMENTS

CN    1511628 A    7/2004

* cited by examiner

*Primary Examiner* — Jason M Greene
*Assistant Examiner* — Dung H Bui
(74) *Attorney, Agent, or Firm* — James C Paschall

(57) ABSTRACT

Embodiments of a gas-solids separation unit and embodiments of a method for manufacturing a separation unit are provided. In one embodiment, the separation unit includes a cyclonic separator and a vessel having a flue gas chamber, a clean gas chamber, and an entrained solids chamber between the flue gas chamber and the clean gas chamber. The cyclonic separator includes, in turn, a cyclone barrel extending from the flue gas chamber toward the clean gas chamber, a swirl vane positioned across the cyclone barrel, a gas outlet tube fluidly coupling the cyclone barrel to the clean gas chamber, and a first check valve opening formed through the barrel sidewall upstream of the gas outlet tube. The check valve opening fluidly couples the cyclone barrel to the entrained solids chamber to permit the centrifugal separation of the particulate matter from the gas stream during operation of the gas-solids separation unit.

20 Claims, 5 Drawing Sheets

GAS-SOLIDS SEPARATION UNITS AND METHODS FOR THE MANUFACTURE THEREOF

FIELD OF THE INVENTION

Embodiments of the present invention relate to gas-solids separation units well-suited for usage within fluid catalytic cracking systems, as well as to methods for the manufacture of gas-solids separation units.

DESCRIPTION OF RELATED ART

Fluid catalytic cracking (FCC) is a widely-utilized process wherein a heavy hydrocarbon feed (e.g., raw oil) is contacted with a catalyst under elevated temperatures and pressures within a main reactor to yield lighter hydrocarbon products. During the cracking process, catalyst activity gradually decreases due to the deposition of coke on the catalyst granules. To restore catalyst activity, the spent catalyst is continually withdrawn from the main reactor through a spent catalyst standpipe and supplied to a catalyst regenerator in which combustion occurs to burn-off the coke deposits. The regenerated catalyst is then recycled to the riser of the main reactor to again contact the heavy hydrocarbon feed and repeat the cracking process. The flue gas generated as a result of combustion within the catalyst regenerator is collected within an upper manifold and, depending upon flue gas temperature, is typically either supplied to a stack for exhaustion to atmosphere or expanded through one or more turbines for power recover.

Catalyst particles inevitably become entrained within the flue gas generated during combustion within the catalyst regenerator. The catalyst regenerator is often equipped with first and second stage separators, which are collectively able to remove larger catalyst particles (e.g., particles having an average diameter exceeding about 50 microns and often approaching or exceeding 100 microns) from the flue gas stream with relative ease. However, smaller catalyst particles (e.g., particles having an average diameter less than about 50 microns) often remain entrained in the flue gas stream discharged from the catalyst regenerator. These smaller catalyst particles resemble fine grains of sand and are commonly referred to as "catalyst fines." If not removed from the flue gas stream, at least in large part, the abrasive catalyst fines may gradually erode components downstream of the catalyst generator, such as the blades of a turbine included within a power recovery unit. It may thus be desirable to remove the catalyst fines to prevent or at least minimize such erosion and/or to reduce the quantity of particulate matter exhausted to atmosphere in satisfaction of prevailing environmental regulations.

Solids-gas separators, commonly referred to as third stage separators or "TSSs," have been developed to remove catalyst fines from the flue gas stream discharged from catalyst regenerator. One of the most effective types of TSS includes a vessel containing a number of uniflow cyclonic separators, as developed and commercially marketed by UOP, LLC, headquartered in Des Plaines, Ill. An individual uniflow cyclonic separators may be able to remove a significant amount of particulate fines from the portion of flue gas stream directed through the separator's cyclone barrel. This notwithstanding, further improvements in the design of such uniflow cyclonic separators are still possible. In particular, it has been observed that, over the course of continuous operation over a prolonged time period on the order of several years, considerable erosion may occur within the separator cyclone barrel. If sufficiently severe, such erosion may require localized repair or replacement of the entire cyclonic separator, which may necessitate shutdown of the TSS and possibly the FCC system as a whole.

It is thus desirable to provide embodiments of a gas-solids separation unit suitable for usage as a third stage separator within a fluid catalyst cracking system and having reduced maintenance requirements as compared to conventional third stage separators of the type described above. Ideally, embodiments of such a gas-solids separation unit would also provide improved separation performance and would minimize additional break-up of the particulate matter (e.g., the catalyst fines) entrained within the gas stream. It would still further be desirable to provide embodiments of a method for manufacturing such a gas-solids separation unit. Other desirable features and characteristics of embodiments of the present invention will become apparent from the subsequent Detailed Description and the appended Claims, taken in conjunction with the accompanying Drawings and the foregoing Description of Related Art.

SUMMARY OF THE INVENTION

Embodiments of a gas-solids separation unit for separating particulate matter from a gas stream are provided. In one embodiment, the gas-solids separation unit includes a cyclonic separator and a vessel having a flue gas chamber, a clean gas chamber, and an entrained solids chamber between the flue gas chamber and the clean gas chamber. The cyclonic separator includes, in turn, a cyclone barrel extending from the flue gas chamber toward the clean gas chamber, a swirl vane positioned across an upstream portion of the cyclone barrel, a gas outlet tube fluidly coupling the cyclone barrel to the clean gas chamber, and a first check valve opening formed through the sidewall of the cyclone barrel upstream of the gas outlet tube. The first check valve opening fluidly couples the cyclone barrel to the entrained solids chamber to permit the centrifugal separation of the particulate matter from the gas stream during operation of the gas-solids separation unit.

Embodiments of a method for manufacturing a gas-solids separation unit are further provided. The gas-solids separation unit includes vessel containing upper and lower tubesheets defining a flue gas chamber, a clean gas chamber, and an entrained solids chamber between the flue gas chamber and the clean gas chamber. In one embodiment, the method includes the steps of: (i) providing a cyclonic separator comprising a cyclone barrel, a main flow passage defined at least partially by the cyclone barrel, a swirl vane positioned within the main flow passage, and a first check valve opening formed through an upstream portion of the cyclone barrel proximate the swirl vane; and (ii) mounting the cyclonic separator between upper and lower tubesheets such that the main flow passage fluidly couples the flue gas chamber to the clean gas chamber and the check valve opening fluidly couples the main flow passage to the entrained solids chamber.

BRIEF DESCRIPTION OF THE DRAWINGS

The present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding Description of Related Art or the following Detailed Description.

Figure 1:
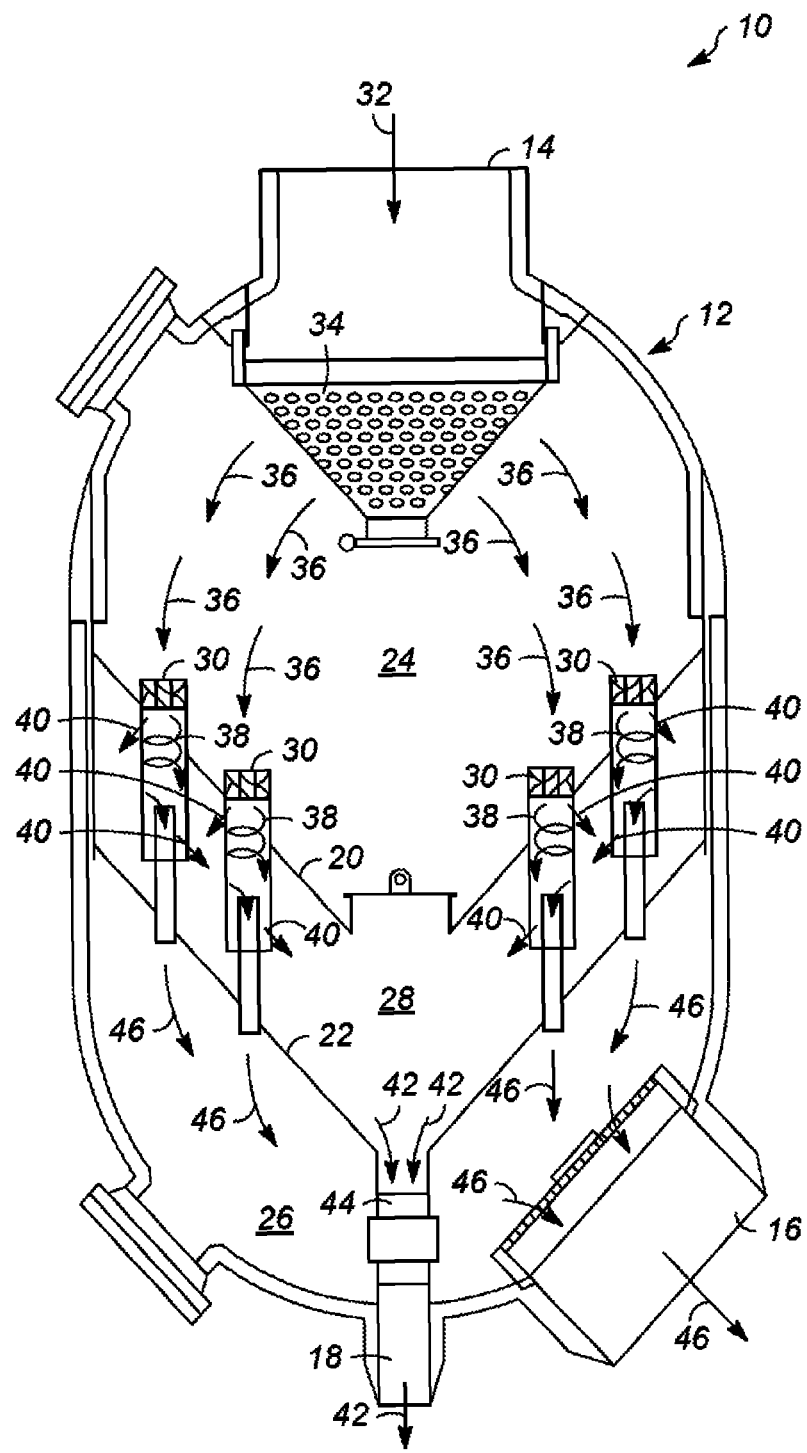
FIG. 1 is a simplified cross-sectional view of a gas-solids separation unit including a plurality of cyclonic separators and illustrated in accordance with an exemplary embodiment of the present invention.

FIG. 1 is a simplified cross-sectional view of a gas-solids separation unit 10 illustrated in accordance with an exemplary embodiment of the present invention. During operation, gas solids separation unit 10 removes particulate matter entrained in a gas stream to, for example, reduce the quantity of particulate matter exhausted to the atmosphere and/or to minimize erosion of downstream equipment, such one or more turbines included within a power recovery expander unit. Gas solids separation unit 10 is especially well-suited for usage as a separator included within a fluid catalytic cracking ("FCC") system and, specifically, as third stage separator ("TSS"), which receives a flue gas stream from an FCC catalyst regenerator entrained with relatively fine particles of the catalyst utilized in the FCC process. An example of a FCC system in which separation unit 10 may be employed as a TSS is described in U.S. Pat. No. 6,673,133 B2 entitled "CYCLONE FOR SEPARATING FINE SOLID PARTICLES FROM A GAS STREAM," issue Jan. 6, 2004, and assigned to the assignee of the present application. This notwithstanding, it is emphasized that separation unit 10 can be utilized within any application, system, or platform wherein it is desired to remove particulate matter or debris from a gas stream utilizing a continuous, low maintenance separation process.

With reference to the exemplary embodiment illustrated in FIG. 1, gas-solids separation unit 10 includes a vessel 12 having a flue gas inlet 14, a clean gas outlet 16, and an entrained solids outlet 18. Upper and lower tubesheets 20 and 22 are mounted within the shell of vessel 12 and define therewith a flue gas chamber 24, a clean gas chamber 26, and an entrained solids chamber 28 between flue gas chamber 24 and clean gas chamber 26. Flue gas chamber 24, clean gas chamber 26, and entrained solids chamber 28 are fluidly coupled to flue gas inlet 14, clean gas outlet 16, and entrained solids outlet 18, respectively. Upper tubesheet 20 thus bounds the lower section of flue gas chamber 24; upper and lower tubesheets 20 and 22 bound upper and lower sections of entrained solids chamber 28, respectively; and lower tubesheet 22 bounds the upper section of clean gas chamber 26. Stated differently, upper tubesheet 20 partitions flue gas chamber 24 and entrained solids chamber 28, while lower tubesheet 22 partitions entrained solids chamber 28 and clean gas chamber 26. As shown in FIG. 1, upper and lower tubesheets 20 and 22 may each assume the form of a generally conical wall, which extends radially inward from an inner circumferential surface of vessel 12 to divide the interior of vessel 12 into chambers 24, 26, and 28 as just described.

A plurality of cyclonic separators 30 are mounted within vessel 12 and extend from upper tube sheet 20 to lower tube sheet 22. As a specific and non-limiting example, gas-solids separation unit 10 may include 8 to 200 such separators 30, which are circumferentially distributed around the longitudinal axis of vessel 12 to produce a separation manifold. The longitudinal axes of cyclonic separators 30 may be substantially parallel with the longitudinal axis of vessel 12; and, in embodiments in which vessel 12 is vertically oriented, separators 30 may likewise be vertically oriented. Cyclonic separators 30 thus extend in a generally vertical direction across entrained solids chamber 28 to allow fluid communication from flue gas chamber 24 to clean gas chamber 26. In addition, each cyclonic separator 30 includes one or more unidirectional flow orifice (referred to herein as "check valve openings"), which fluidly couple flue gas chamber 24 to entrained solids chamber 28 to permit the removal of entrained solids from the gas stream, as described in detail below.

During operation of gas-solids separation unit 10, a flue gas stream 32 is supplied to flue gas inlet 14 by, for example, an FCC regenerator upstream of separation unit 10. As indicated above, flue gas stream 32 carries particulate matter; and, in the case of an FCC system specifically, gas stream 32 is laden with relatively small catalyst particles (e.g., having an average diameter less than 50 microns) commonly referred to as "catalyst fines." As shown in FIG. 1, a conical perforated diffuser 34 may be mounted within an upper portion of vessel 12 to distribute the flue gas stream substantially evenly over the cross-sectional area of flue gas chamber 24, as indicated in FIG. 1 by arrows 36. The flue gas stream enters the upstream ends of cyclonic separators 30, which impart the substantially smooth or laminar gas flow with a substantially swirling or vortex-like flow pattern (represented in FIG. 1 by arrows 38). As the gas flow follows these swirling or spiral-shaped flowpaths downward through cyclonic separators 30, centrifugal forces urge the catalyst fines radially outward and against the inner annular walls of separators 30. As further indicated in FIG. 1 by arrows 40, the majority and, perhaps, the vast majority of the catalyst fines flow through sidewall orifices or check valve openings provided in separators 30, which are not shown in FIG. 1 for clarity and described in detail below. The fines passing through the check valve openings are carried by a relatively small amount (e.g., about 3-5%, by volume) of the flue gas commonly referred to the "underflow" into entrained solids chamber 28. The fines-laden underflow is then discharged from separation unit 10 through entrained solids outlet 18 (indicated in FIG. 1 by arrows 42), which may be fluidly coupled to entrained solids chamber 28 by way of a central solids drain pipe 44. Depending upon the particular application in which separation unit 10 is employed, the fines-laden underflow may then be supplied to a fourth stage filter for further particulate removal or, instead, reinjected to location downstream of vessel 12.

As gas flow is forced through each separator 30, centrifugal forces urge catalyst fines radially outward and away from the separator centerline, as described above. In so doing, the catalyst fines are removed from the innermost core gas flow conducted through the radial center of cyclonic separators 30. This core gas flow, which is substantially particle free and thus referred to herein as the "clean gas flow," is discharged from the lower ends of cyclonic separators 30, into clean gas chamber 26, and ultimately exits vessel 12 through clean gas outlet 16 (represented in FIG. 1 by arrows 46). In embodiments wherein temperature of the flue gas stream is greater than about 760° C. (commonly referred to as "hot TSS applications"), the clean gas may be supplied to a turbine included within power recovery expander unit. In this case, removal of the fines from the gas stream minimizes erosion of the turbine blades and thus prolongs the operational lifespan of the turbine. Alternatively, flue gas is greater than about 340° C., but less than about 760° C. (commonly referred to as "low temperature TSS applications"), the clean gas may be supplied to a stack for exhaustion to atmosphere. In this case, removal of the fines decreases the amount of particulate matter in the exhaust, which may be required to satisfy environmental regulations depending upon the particular geographical region and regulatory authority governing the operation of the FCC system (or other system) in which solids-gas separation unit 10 is employed.

Figure 2:
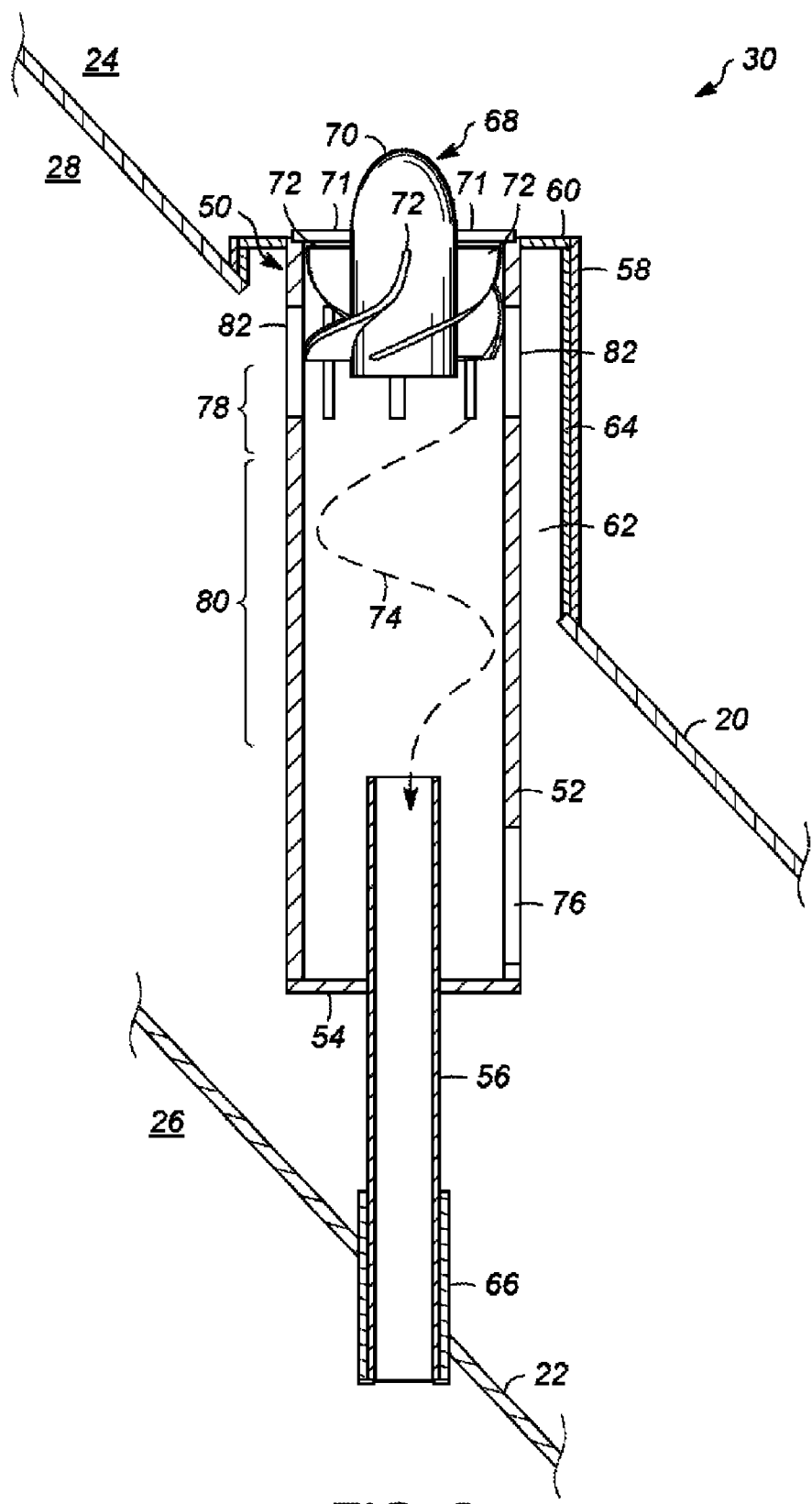
FIG. 2 is a cross-sectional view of a portion of the gas-solids separation unit shown in FIG. 1 illustrating in greater detail an exemplary embodiment of one of the cyclonic separators including a plurality of early-stage check valve openings.

FIG. 2 is a cross-sectional view of a portion of solids-gas separation unit 10 taken through one cyclonic separator 30 and illustrated in accordance with an exemplary embodiment. Cyclonic separator 30 includes (amongst other components) a separator flowbody 50, which extends across entrained solids chamber 28 to fluidly couple flue gas chamber 24 to clean gas chamber 26. In the illustrated example, separator flowbody 50 is comprised of three components, namely, a cyclone barrel 52, a barrel end plate 54, and a gas outlet tube 56. As indicated in FIG. 2, cyclone barrel 52 conveniently assumes the form of an elongated pipe having an upper or upstream end, which extends through an opening provided in upper tube sheet 20 and projects upwardly therefrom; and a lower or downstream end, which projects downwardly into entrained solids chamber 28. Similarly, gas outlet tube 56 may assume the form of an elongated pipe having an outer diameter less than the inner diameter of cyclone barrel 52; e.g., in one embodiment, the inner diameter of outlet tube 56 may be about one half to one third the inner diameter of cyclone barrel 52. Gas outlet tube 56 is fluidly coupled to the lower end of cyclone barrel 52 and extends downwardly therefrom through an opening provided in lower tubesheet 22 into clean gas chamber 26. Gas outlet tube 56 may extend through the central opening provided in barrel end plate 54 and into the lower end portion of cyclone barrel 52. Finally, barrel end plate 54 assumes the form of an annular plate or disc, which encloses (at least in substantial part) the lower end of cyclone barrel 52. In low temperature TSS applications, barrel end plate 54 may be rigidly joined between cyclone barrel and gas outlet tube 56; e.g., the outer circumferential edge of barrel end plate 54 may be joined (e.g., welded) to the lower end of cyclone barrel 52, and inner circumferential edge of end plate 54 may be joined (e.g., welded) to an outer circumferential surface of gas outlet tube 56. However, in hot TSS applications, barrel end plate 54 may be joined to only one of cyclone barrel 52 and gas outlet tube 56, while a small annular clearance is provided between end plate 54 and the other of barrel 52 and outlet tube 56 to accommodate differences in thermal expansion.

An upper portion of cyclone barrel 52 is joined to upper tube sheet 20 by way of a tubular sleeve 58, a low portion of tubular sleeve 58 is affixed (e.g., circumferentially welded) to upper tube sheet 20; and an annular end plate 60, which is sealingly joined between the upper edge of tubular sleeve 58 and cyclone barrel 52. In embodiments wherein one or more check valve openings (e.g., check valve openings 82 described below) are formed through cyclone barrel 52 at an elevation transected by or above upper tube sheet 20, the inner diameter of tubular sleeve 58 may be greater than the outer diameter of cyclone barrel 52 such that a circumferential clearance 62 is created between sleeve 58 and barrel 52. Such a circumferential clearance 62 receives catalyst fines discharged through the check valve openings and directs the fines into entrained solids chamber 28 below. If desired, a wear-resistant liner or coating 64 may be positioned, applied, or grown over the interior of tubular sleeve 58 to minimize erosion of the interior of sleeve 58 due to contact with the abrasive catalyst particles. This notwithstanding, in embodiments wherein the below-described check valve slots are formed at an elevation below upper tube sheet 20 or in embodiments wherein cyclone barrel 52 includes only check valve slots facing toward the vessel wall, the inner circumference of tubular sleeve 58 may be conformal or contiguous with the outer circumference of cyclone barrel 52 thereby eliminating the need for clearance 62 and/or end plate 60. Finally, as further shown in FIG. 2, a tubular sleeve 66 may be conformally disposed around a lower end portion of gas outlet tube 56 to mount outlet tube 56 to lower tubesheet 22 in a structurally secure manner.

A swirl vane device 68 (referred to herein simply as "swirl vane 68") is positioned across an upper or upstream portion of cyclone barrel 52. Swirl vane 68 includes a domed centerbody 70, which is centrally suspended within the upper portion of barrel 52 by, for example, a number of radially-extending beams 71. A plurality of swirl blades 72 extend radially outward from centerbody 70 and wrap or twist tangentially around the longitudinal axis of cyclonic separator 30. As gas flow is forced through cyclone barrel 52, swirl vane 68 imparts the gas flow with a swirling or vortex-type flow pattern, as generically represented in FIG. 2 by dashed line 74. As previously indicated, such a swirling or spiral-type flow pattern generates centrifugal forces, which urge the catalyst fines entrained within the gas stream radially outward from the centerline of cyclone barrel 52 and against the interior wall of barrel 52 thereby facilitating the removal of the fines through one or more check valve openings, such as check valve openings 76 and 82 described below.

Cyclonic separator 30 is conveniently (although not necessarily) fabricated to further include a terminal check valve opening 76 formed through the lower end of cyclone barrel 52 radially adjacent the penetrating section of gas outlet tube 56. The term "check valve opening," as appearing herein, is defined as an opening or orifice that permits solids-laden gas flow in substantially one direction under normal operating conditions of the gas-solids separation unit and, thus, prevents undesired backflow from entering cyclone barrel 52 in a manner similar to a check valve. Backflow through the check valve opening or openings is prevented or at least substantially impeded by selecting the total cross-sectional flow area of the check valve opening(s) (along with other parameters, such as the difference in inner diameters between cyclone barrel 52 and outlet tube 56) to ensure a relatively high pressure drop when transitioning from the interior of cyclone barrel 52 to entrained solids chamber 28. Thus, during operation of cyclonic separator 30, the underflow-entrained fines are permitted to exit the lower end of barrel 52, flow through terminal check valve opening 76, and enter entrained solids chamber 28 for subsequently removal via solids drain pipe 44 and entrained solids outlet 18 (FIG. 1). By comparison, the relatively clean core gas flow flows through gas outlet tube 56, into clean gas chamber 26, and is ultimately discharged from solids-gas separation unit 10 via clean gas outlet 16 (FIG. 1).

As indicated in the foregoing section entitled "BACKGROUND," the present inventors have discovered that certain conventional cyclonic separators including a terminal check valve opening are limited in certain respects. In particular, it has been discovered that, over prolonged periods of continuous operation, severe erosion of the cyclone barrel's interior surfaces may occur. It has further been discovered that this erosion is largely concentrated within an annular band located immediately below swirl vane 68, as generally designated in FIG. 2 by reference numeral 78; e.g., in an embodiment wherein the length of the cyclone barrel is approximately 40 inches, the band of primary erosion may be localized at approximately 2 inches ±1 inch below the swirl vane. In general, the primary band of erosion represents the region over which the catalyst fines impinge the interior wall of cyclone barrel 52 with the greatest impact energy. Impingement of the fines in this zone has been found to gradually remove material from the inner surface of cyclone barrel 52 and may ultimately create circumferential groove within the interior of barrel 52 in which the catalyst fines can become trapped. The trapped catalyst fines may continuously rotate in this circumferential groove further exacerbating erosion of the cyclone barrel wall and, given sufficient time, possibly wear through the radial thickness of the barrel wall. Such interior erosion of the cyclone barrel may ultimately necessitate system shutdown to repair the damage to barrel 52. Hard impact of the catalyst fines against the barrel inner wall may also result in further break-up or fragmentation of the catalyst particles thereby yielding particles having still lower masses, which are increasingly difficult to remove by centrifugal separation. As a still further issue, it has been determined through at least flow modeling that a turbulent zone 80 may be created within an intermediate section of cyclone barrel 52 downstream of swirl vane 68 and upstream of the inlet of gas outlet tube 56 and terminal check valve opening 76. Previously-separated fines passing through this turbulent zone 80 may be reintroduced into the core gas flow path and enter the inlet of gas outlet tube 56 thereby decreasing the overall effectiveness of the gas-solids separation unit.

To overcome the above-noted limitations, cyclonic separator 30 is fabricated to include one or more early-stage check valve openings 82 upstream of the inlet of gas outlet tube 56 in addition to or in lieu of terminal check valve 76. Check valve openings 82 are preferably formed in an upstream section of cyclone barrel 52 and optimally located so as to allow the outflow of particulate fines from within or immediately prior to reaching the primary band of erosion 78. In this regard, it is preferred that at least a portion of one or more of check valve openings 82 is formed within the primary band of erosion 78 and/or immediately below or downstream of swirl vane 68. As appearing herein, the phrase "immediately below" denotes that a check valve opening, or a portion thereof, is located closer to swirl vane 68 than to the inlet of gas outlet tube 56, as taken along the longitudinal axis of cyclonic separator 30. In certain embodiments, a portion of one or more of the check valve openings may be formed radially adjacent swirl vane 68 such that the check valve openings penetrate or extend radially through the section of the annular barrel wall surrounding or circumscribing vane 68. Further illustrating this point, check valve openings 82 are depicted in FIG. 2 and also in FIG. 3 (an isometric view separator flowbody 50) of as a plurality of longitudinally-elongated slots, which extend from a region of the barrel wall radially adjacent the lower or outlet end of swirl vane 68 into a region immediately below swirl vane 68 and overlapping with the primary band of erosion 78. In the illustrated example, check valve openings 82 are circumferentially spaced or angularly distributed about the longitudinal axis of separator 30 such that openings 82, take collectively, circumferentially surround or are formed around the lower end of vane 68.

Figure 3:
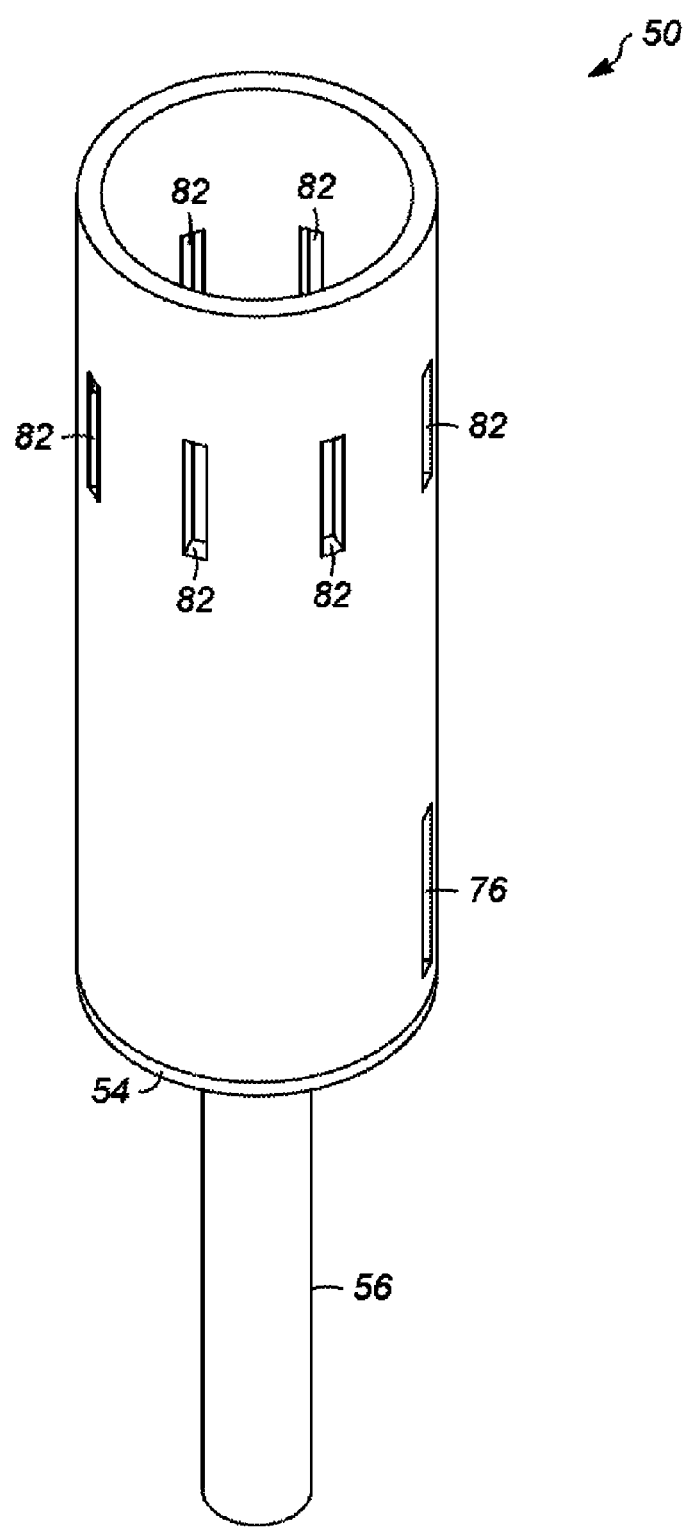
FIG. 3 is an isomeric view of the flowbody included within the exemplary cyclonic separator shown in FIG. 2.
Figure 4:
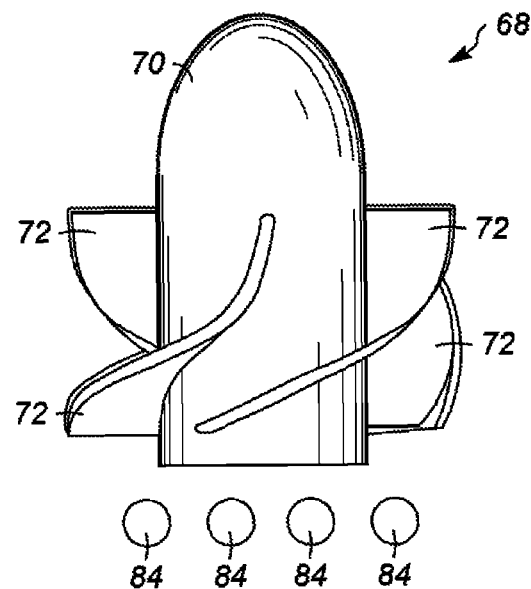
FIGS. 4-7 schematically illustrate several additional and non-limiting examples of alternative geometries and dispositions of early-stage check valve openings that may potentially be included within further embodiments of the cyclonic separators.
Figure 5:
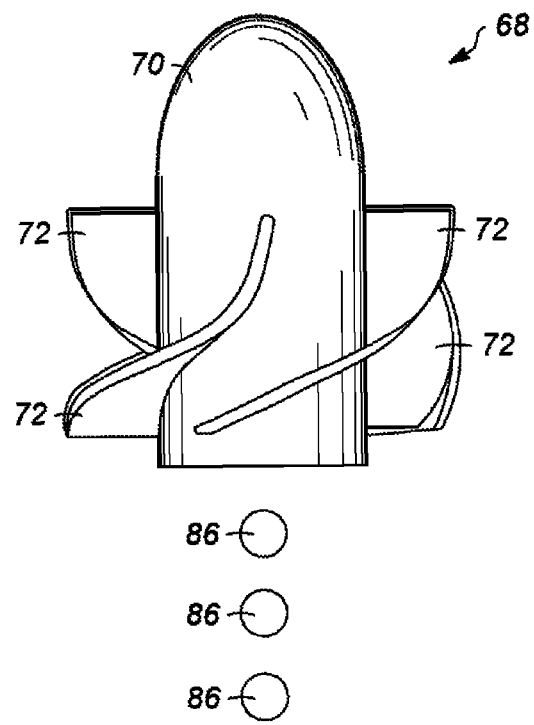
Figure 6:
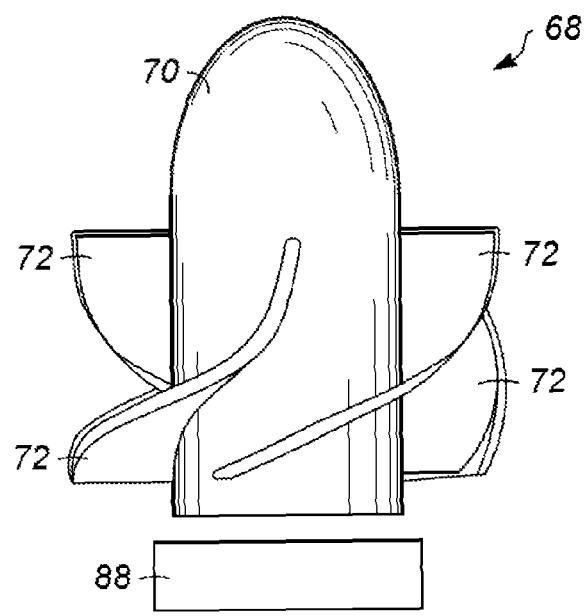
Figure 7:
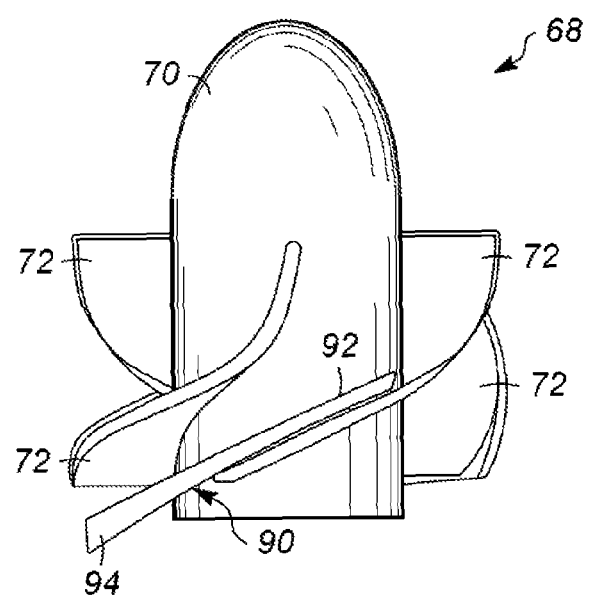

The exemplary embodiment shown in FIGS. 2 and 3 is provided by way of non-limiting illustration only, and that the early-stage check valve opening or openings may assume various other orientations, shapes, dispositions, and sizes providing that backflow of the fine-laden underflow is generally prevented, as previously described. For example, in an alternative embodiment generically illustrated in FIG. 4, the early-stage check valve opening or openings assume the form of a series of generally circular apertures or holes 84 formed through the barrel wall (not shown for clarity) immediately below swirl vane 68 and circumferentially spaced about the longitudinal axis of separator 30. Alternatively, in a further embodiment generically illustrated in FIG. 5, the check valve opening or openings comprise a series of generally circular apertures or holes 86 formed through the barrel wall (not shown) immediately below swirl vane 68 at varying elevations. As a still further example, the check valve opening may be a single laterally-elongated or vertical slot 88 formed immediately below swirl vane 68, as indicated in FIG. 6. As a still further example, and with reference to FIG. 7, the check valve opening may assume the form of a plurality of tangential slots 90 (only one slot 90 shown in FIG. 7 for clarity) formed in the barrel wall and following, at least in part, the contour of a lower portion each swirl blade 72. In this case, and in other embodiments, it may be desirable to impart slot 90 with a tapered geometry such that the width of the slot gradually increases when transitioning from the slot's upstream end 92 to the slot's downstream end 94. Various other check valve opening geometries are also possible including, for example, openings having a generally square cross-sectional geometry. Regardless of the particular check valve opening cross-sectional geometry, it is generally preferred that the check valve opening or openings are not purely orthogonal to the barrel wall, but are instead formed at an angle or slant corresponding with the direction in which the vortex gas flow twists about the longitudinal axis of centrifugal separator 30.

With reference once again to FIGS. 2 and 3, by forming early-stage check valve openings 82 through an upstream portion of the annular wall of cyclone barrel 52 (or similar check valve openings, such as openings 84, 86, 88, or 90 shown in FIGS. 4, 5, 6, and 7, respectively), particles fines can be removed from cyclone barrel 52 prior to causing significant erosion of barrel 52 within primary erosion band 78 or elsewhere along the barrel's interior surface. Thus, relative to cyclonic separator lacking such early-stage check valve openings, cyclonic separator 30 can be operated continuously for longer periods of time with reduced maintenance requirements. Early-stage removal of particle fines through check valve openings 82 also reduces the number of high energy impacts between the catalyst fines and the barrel wall, which, in turn, decreases further fragmentation of the catalyst fines to better preserve average particle mass and facilitate removal of the fines via centrifugal separation. As a still further advantage, early-stage removal of particle fines through check valve openings 82 removes a large quantity of the fines prior to passage through turbulent zone 80. This, in turn, decreases the quantity of entrained catalyst fines available for reintroduction into the core gas flow by turbulent gas flow within zone 80 thereby further improving the overall separation performance of cyclonic separator 30 and, more generally, of gas-solids separation unit 10 (FIG. 1).

The foregoing has thus provided exemplary embodiments of gas-solids separation unit, such as a third stage separator included within a fluid catalytic cracking system, that provides improved separation performance and lower maintenance requirements as compared to conventional separation units. As a result, embodiments of the above-described exemplary gas-solids separation unit are able to separate particulate matter from an input gas stream in a highly efficient manner, while providing continuous operation for prolonged periods of time on the order of several years. While described above in the context of multiple exemplary embodiments each including a different number and/or type of early-stage check valve openings, it is emphasized that the above-disclosed check valve openings can be combined in various manners to yield additional embodiments of cyclonic separator. Such features are therefore not mutually exclusive in the context of the present disclosure.

The foregoing has also provided embodiments of a method for manufacturing a gas-solids separation unit. The gas-solids separation unit includes vessel containing upper and lower tubesheets defining a flue gas chamber, a clean gas chamber, and an entrained solids chamber between the flue gas chamber and the clean gas chamber. In one embodiment, the method includes the steps of: (i) providing a cyclonic separator comprising a cyclone barrel, a main flow passage defined at least partially by the cyclone barrel, a swirl vane positioned within the main flow passage, and a first check valve opening formed through an upstream portion of the cyclone barrel proximate the swirl vane; and (ii) mounting the cyclonic separator between upper and lower tubesheets such that the main flow passage fluidly couples the flue gas chamber to the clean gas chamber and the check valve opening fluidly couples the main flow passage to the entrained solids chamber. The cyclonic separator may be obtained by manufacturing or producing, in which case a primary erosion zone may first be identified in the vicinity of (e.g., immediately below) the swirl vane, and a first check valve opening may be formed (e.g., by cutting) in the cyclone barrel at least partially within the primary erosion zone.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. A gas-solids separation unit for separating particulate matter from a gas stream, the gas-solids separation unit comprising:
    a vessel having a flue gas chamber, a clean gas chamber, and an entrained solids chamber; and
    a cyclonic separator, comprising:
    a cyclone barrel extending from the flue gas chamber toward the clean gas chamber;
    a swirl vane positioned across an upstream portion of the cyclone barrel;
    a gas outlet tube fluidly coupling the cyclone barrel to the clean gas chamber; and
    a first check valve opening formed through a sidewall of the cyclone barrel upstream of the gas outlet tube, the first check valve opening fluidly coupling the cyclone barrel to the entrained solids chamber to permit the centrifugal separation of the particulate matter from the gas stream during operation of the gas-solids separation unit.

2. A gas-solids separation unit according to claim 1 wherein at least a portion of the first check valve opening is formed through the upstream portion of the cyclone barrel.

3. A gas-solids separation unit according to claim 2 wherein at least a portion of the first check valve opening is formed through the cyclone barrel immediately below the swirl vane, as taken along the longitudinal axis of the cyclone barrel.

4. A gas-solids separation unit according to claim 2 wherein at least a portion of the first check valve opening is located radially adjacent a downstream end of the swirl vane.

5. A gas-solids separation unit according to claim 2 wherein the swirl vane comprises:
    a central body; and
    a plurality of blades extending radially from the central body and wrapping around the longitudinal axis thereof, at least a portion of the first check valve opening located radially adjacent the plurality of blades.

6. A gas-solids separation unit according to claim 5 wherein at least a portion of the first check valve opening generally follows a contour of a downstream edge of one of the plurality of blades.

7. A gas-solids separation unit according to claim 1 wherein the cyclone barrel further comprises a downstream portion into which the gas outlet tube extends.

8. A gas-solids separation unit according to claim 7 further comprising a terminal check valve opening formed through the downstream portion of the cyclone barrel.

9. A gas-solids separation unit according to claim 8 wherein the terminal check valve opening comprises a longitudinal slot formed through the cyclone barrel at a location radially adjacent the upstream end of the gas outlet tube.

10. A gas-solids separation unit according to claim 2 wherein the first check valve opening comprises one of the group consisting of a longitudinal and a lateral slot.

11. A gas-solids separation unit according to claim 2 wherein the cyclonic separator comprises a plurality of check valve openings formed through the cyclone barrel and in which the first check valve opening is included.

12. A gas-solids separation unit according to claim 11 wherein the plurality of check valve openings comprises a plurality of holes formed through the cyclone barrel at different elevations.

13. A gas-solids separation unit according to claim 11 wherein the plurality of check valve openings is circumferentially-spaced about the longitudinal axis of the cyclone barrel.

14. A gas-solids separation unit according to claim 2 wherein the cyclone barrel has a primary erosion zone, and wherein at least a portion of the first check valve opening is formed in the primary erosion zone.

15. A gas-solids separation unit according to claim 2 further comprising:
    an upper tube sheet mounted within the vessel and partitioning the flue gas chamber and the entrained solids chamber; and
    a lower tube sheet mounted within the vessel and partitioning the entrained solids chamber and the clean gas chamber, the cyclonic separator extending from the upper tube sheet to the lower tube sheet.

16. A gas-solids separation unit according to claim 15 further comprising:
    a generally cylindrical sleeve fixedly projecting upwardly from the upper tube sheet and extending around an upper portion of the cyclone barrel; and
    a circumferential clearance provided between the upper portion of the cyclone barrel and the generally cylindrical sleeve.

17. A gas-solids separation unit according to claim 16 wherein the cyclone barrel has a main flow passage, and wherein at least a portion of the first check valve opening extends from the main flow passage, through a sidewall of the cyclone barrel, and to the circumferential clearance provided between the upper portion of the cyclone barrel and the generally cylindrical sleeve.

18. A gas-solids separation unit, comprising:
   a vessel having a flue gas inlet, an entrained solids outlet, and a clean gas outlet;
   upper and lower tube sheets within the vessel and defining therewith a gas inlet chamber fluidly coupled to the flue gas inlet, an entrained solids chamber fluidly coupled to the entrained solids outlet, and a clean gas chamber fluidly coupled to the clean gas outlet; and
   a cyclonic separator, comprising:
      a cyclone barrel extending across the entrained solids chamber to fluidly couple the gas inlet chamber to the clean gas chamber;
      a swirl vane positioned across an upstream portion of the cyclone barrel; and
      at least one check valve opening formed through a sidewall of the cyclone barrel radially adjacent a downstream end of the swirl vane and fluidly coupling the cyclone barrel to the entrained solids chamber.

19. A method for manufacturing a gas-solids separation unit of a type that includes vessel containing upper and lower tubesheets defining a flue gas chamber, a clean gas chamber, and an entrained solids chamber between the flue gas chamber and the clean gas chamber, the method comprising:
   providing a cyclonic separator comprising a cyclone barrel, a main flow passage defined at least partially by the cyclone barrel, a swirl vane positioned within the main flow passage, and a first check valve opening formed through an upstream portion of the cyclone barrel proximate the swirl vane; and
   mounting the cyclonic separator between upper and lower tubesheets such that the main flow passage fluidly couples the flue gas chamber to the clean gas chamber and the check valve opening fluidly couples the main flow passage to the entrained solids chamber.

20. A method according to claim 19 further comprising producing the cyclonic separator, the step of producing comprising:
   identifying a primary erosion zone immediately below the swirl vane; and
   forming the first check valve opening in the cyclone barrel and at least partially within the primary erosion zone.

* * * * *